(12) United States Patent
Katsuura et al.

(10) Patent No.: US 12,162,346 B2
(45) Date of Patent: Dec. 10, 2024

(54) WORKING VEHICLE

(71) Applicant: KUBOTA CORPORATION, Osaka (JP)

(72) Inventors: Tomoya Katsuura, Sakai (JP); Yuichiro Matoba, Sakai (JP); Shigeru Komatsu, Sakai (JP); Kazuya Okubo, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/533,267

(22) Filed: Dec. 8, 2023

(65) Prior Publication Data

US 2024/0308333 A1    Sep. 19, 2024

(30) Foreign Application Priority Data

Mar. 14, 2023 (JP) ................ 2023-039738

(51) Int. Cl.
*B60K 25/02* (2006.01)
*B60K 25/06* (2006.01)
(Continued)

(52) U.S. Cl.
CPC ............. *B60K 25/02* (2013.01); *B60K 25/06* (2013.01); *B62D 5/063* (2013.01); *B62D 5/07* (2013.01);
(Continued)

(58) Field of Classification Search
CPC .. B60K 25/02; B60K 25/06; B60K 2025/026; F15B 21/0423; F15B 15/20; B62D 5/063;
(Continued)

(56) References Cited

U.S. PATENT DOCUMENTS 4,773,216 A * 9/1988 Ohashi ................. F15B 13/022
91/532
8,701,818 B2 * 4/2014 Shirao .................. E02F 9/2253
180/305
(Continued)

FOREIGN PATENT DOCUMENTS

JP    2010-284136 A    12/2010

OTHER PUBLICATIONS

Official Communication issued in corresponding European Patent Application No. 24156872.4, mailed on Jul. 30, 2024, 10 pages.

*Primary Examiner* — Toan C To
(74) *Attorney, Agent, or Firm* — Keating & Bennett, LLP

(57) ABSTRACT

A working vehicle includes a first hydraulic pump (e.g., a variable displacement pump) with a delivery flow rate controlled by load sensing control, a second hydraulic pump (e.g., a fixed displacement pump), at least one working-machine-related control valve to control at least one working-machine-related hydraulic actuator, a power shift valve to control at least one traveling-power-transmission-related hydraulic actuator, and a power steering controller to control a steering-related hydraulic actuator. The at least one working-machine-related control valve is provided in a first hydraulic system supplied with hydraulic fluid by the first hydraulic pump, and at least one of the power shift valve or the power steering controller is provided in a second hydraulic system supplied with hydraulic fluid by the second hydraulic pump.

11 Claims, 9 Drawing Sheets

(51) Int. Cl.
  *B62D 5/06* (2006.01)
  *B62D 5/07* (2006.01)
  *B62D 49/06* (2006.01)
  *F15B 15/20* (2006.01)
  *F15B 21/0423* (2019.01)
  *F16H 47/02* (2006.01)
  *F16H 63/30* (2006.01)

(52) U.S. Cl.
  CPC .............. *B62D 49/06* (2013.01); *F15B 15/20* (2013.01); *F15B 21/0423* (2019.01); *F16H 47/02* (2013.01); *F16H 63/3023* (2013.01); *B60K 2025/026* (2013.01); *F16H 2047/025* (2013.01)

(58) Field of Classification Search
  CPC ........... B62D 5/07; B62D 49/06; F16H 47/02; F16H 63/3023; F16H 2047/025
  See application file for complete search history.

(56) References Cited

U.S. PATENT DOCUMENTS

| | | | |
|---|---|---|---|
| 9,279,236 B2* | 3/2016 | Zhang | E02F 9/2292 |
| 10,962,110 B2* | 3/2021 | Teramoto | F16H 61/4035 |
| 2005/0183416 A1* | 8/2005 | Hayashi | E02F 9/2296 |
| | | | 60/445 |
| 2006/0150757 A1* | 7/2006 | Nishino | B60K 17/344 |
| | | | 74/11 |
| 2007/0137338 A1* | 6/2007 | Nishi | F16H 61/433 |
| | | | 74/335 |
| 2008/0209903 A1* | 9/2008 | Itoga | E02F 9/2235 |
| | | | 60/494 |
| 2014/0144129 A1* | 5/2014 | Shirao | F15B 15/20 |
| | | | 60/459 |
| 2016/0121900 A1 | 5/2016 | Yoshizawa et al. | |
| 2020/0087890 A1* | 3/2020 | Fukuda | E02F 9/2292 |
| 2020/0391589 A1* | 12/2020 | Azuma | F16D 67/04 |
| 2022/0287219 A1* | 9/2022 | Yoshimura | B62D 11/08 |

* cited by examiner

WORKING VEHICLE

CROSS REFERENCE TO RELATED APPLICATIONS

This application claims the benefit of priority to Japanese Patent Application No. 2023-039738 filed on Mar. 14, 2023. The entire contents of this application are hereby incorporated herein by reference.

BACKGROUND OF THE INVENTION

1. Field of the Invention

The present invention relates to working vehicles such as tractors.

2. Description of the Related Art

A working vehicle disclosed in Japanese Unexamined Patent Application Publication No. 2010-284136 has been known.

The working vehicle disclosed in Japanese Unexamined Patent Application Publication No. 2010-284136 is a tractor equipped with a controller that controls a hydraulic pump and a hydraulic actuator driven by the hydraulic pump.

SUMMARY OF THE INVENTION

An open center system and a load sensing system are known as hydraulic systems for a tractor. In the open center system, hydraulic fluid is supplied to a hydraulic actuator and a controller to control the hydraulic actuator by a fixed displacement gear pump. In the load sensing system, a necessary amount of hydraulic fluid is supplied to a hydraulic actuator and a controller to control the hydraulic actuator by a variable displacement pump with a delivery flow rate which is controlled by load sensing control.

In contrast to the open center system, the load sensing system has, for example, the following advantages: (1) hydraulic pressure loss is small, and energy saving and low heat generation are achieved; (2) a maximum suppliable flow rate of hydraulic pressure is high; (3) the flow rate can be ensured in an engine low rotation region, and energy saving, low heat generation, and low noise are achieved; and (4) the supply flow rate to the valve is constant regardless of the load, and combined operation is better.

However, in contrast to the open center system, in the load sensing system, there is a tendency that the circuit is complicated, and the system configuration increases in size.

For example, the load sensing system has a characteristic that when a maximum flow rate of the pump is used up by an operation of hydraulic actuators at the same time, hydraulic fluid is preferentially supplied to a hydraulic actuator with a low load. Therefore, if a controller that controls working-machine-related hydraulic actuators, a controller that controls travelling-power-transmission-related hydraulic actuators including speed-change-related actuators, and a controller that controls steering-related hydraulic actuators are simply arranged in parallel, when a large flow rate with low load is used by a hydraulic actuator other than the travelling-power-transmission-related actuators and the steering-related actuators, there is a possibility that supply of hydraulic fluid to the travelling-power-transmission-related system and the steering-related system may become insufficient. In order to avoid this, a configuration may be adopted in which multiple priority valves are mounted and when the delivery flow rate of the pump is saturated, hydraulic fluid is supplied to the multiple valves in the order of high priority. However, by doing so, the number of priority valves increases, and the circuit configuration of the load sensing system becomes complicated, thus the system configuration increases in size. When the system configuration increases in size, a problem arises in that the system cannot be mounted on a compact tractor.

Example embodiments of the present invention provide working vehicles each of which has a compact structure.

A working vehicle according to an aspect of an example embodiment of the present invention includes a first hydraulic pump which is a variable displacement pump with a delivery flow rate controlled by load sensing control, a second hydraulic pump which is a fixed displacement pump, at least one working-machine-related control valve to control at least one working-machine-related hydraulic actuator, a power shift valve to control at least one traveling-power-transmission-related hydraulic actuator, and a power steering controller to control a steering-related hydraulic actuator, wherein the at least one working-machine-related control valve is provided in a first hydraulic system supplied with hydraulic fluid by the first hydraulic pump, and at least one of the power shift valve or the power steering controller is provided in a second hydraulic system supplied with hydraulic fluid by the second hydraulic pump.

The working vehicle may further include a vehicle body including a front portion to have a front working machine attached thereto. The at least one working-machine-related control valve may include a front-working-machine control valve to control one or more of the at least one working-machine-related hydraulic actuator that are in or on the front working machine.

The working vehicle may further include a vehicle body to have a working machine attached thereto. The at least one working-machine-related control valve may include an auxiliary control valve to control one or more of the at least one working-machine-related hydraulic actuator that are in or on the working machine.

The working vehicle may further include a vehicle body to have a working machine attached thereto, the working machine being provided with one or more of the at least one working-machine-related hydraulic actuator and an external control valve which is one of the at least one working-machine-related control valve, and a hydraulic outlet provided in or on the vehicle body to allow hydraulic fluid to be supplied from the first hydraulic pump to the working machine. The at least one working-machine-related control valve may include the external control valve in or on the working machine.

The working vehicle may include a vehicle body to have a working machine attached thereto, a working-machine-attaching mechanism to attach the working machine to the vehicle body, and a working-machine-lifting actuator which is one of the at least one working-machine-related hydraulic actuator to raise and lower the working-machine-attaching mechanism. The at least one working-machine-related control valve may include a working-machine-lifting control valve to control the working-machine-lifting actuator.

The first hydraulic system may include a third hydraulic pump provided upstream of the first hydraulic pump to supply hydraulic fluid to the first hydraulic pump, and a return passage branching from a hydraulic passage between the third hydraulic pump and the first hydraulic pump and connected to an oil cooler to allow an excess of hydraulic fluid, which flows from the third hydraulic pump to the first hydraulic pump, to return to a reservoir of hydraulic fluid through the oil cooler.

The working vehicle may further include a vehicle body to have a working machine attached thereto. The first hydraulic system may include a feedback passage to allow hydraulic fluid returned from the at least one working-machine-related hydraulic actuator to flow therethrough and connected to the return passage, and a check valve provided in the return passage at a location upstream of a junction between the feedback passage and the return passage to prevent backflow of hydraulic fluid from the junction toward the third hydraulic pump. The at least one working-machine-related control valve may include an auxiliary control valve to control one or more of the at least one working-machine-related hydraulic actuator that are in or on the working machine. The feedback passage may be configured to allow hydraulic fluid returned from the auxiliary control valve to merge with hydraulic fluid flowing through the return passage.

The first hydraulic system may include a drain passage different from the return passage and configured to drain an excess of hydraulic fluid, which flows from the third hydraulic pump to the first hydraulic pump, to the reservoir through a relief valve. A set pressure of the check valve may be lower than a set pressure of the relief valve.

A working vehicle according to another aspect of an example embodiment of the present invention includes a first hydraulic pump which is a variable displacement pump with a delivery flow rate controlled by load sensing control, a second hydraulic pump which is a fixed displacement pump, a vehicle body which houses a transmission shaft to receive power from a power source, and a first shaft and a second shaft which are arranged in a vehicle body width direction on one side of the vehicle body to receive power from the transmission shaft, wherein the first shaft is farther from the vehicle body than the second shaft is, and the first hydraulic pump and the second hydraulic pump face each other in a front-rear direction such that the first hydraulic pump is driven by the first shaft and the second hydraulic pump is driven by the second shaft.

The working vehicle may further include a gear transmission mechanism to transmit power from the transmission shaft, the gear transmission mechanism including a plurality of gears arranged in a lateral direction from the vehicle body. The gear transmission mechanism may include a first pump gear which is one of the plurality of gears that is farthest from the vehicle body, and a second pump gear which is another of the plurality of gears that is closer to the vehicle body than the first pump gear is. The first hydraulic pump and the second hydraulic pump may be arranged in the front-rear direction with the gear transmission mechanism therebetween. The first shaft may be rotatable together with the first pump gear about the same axis. The second shaft may be rotatable together with the second pump gear about the same axis.

The gear transmission mechanism may include a transmission gear rotatable together with the transmission shaft, a first idle gear to be engaged with the transmission gear, and a second idle gear to be engaged with the first idle gear and the second pump gear. The first pump gear may be engaged with the second pump gear.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
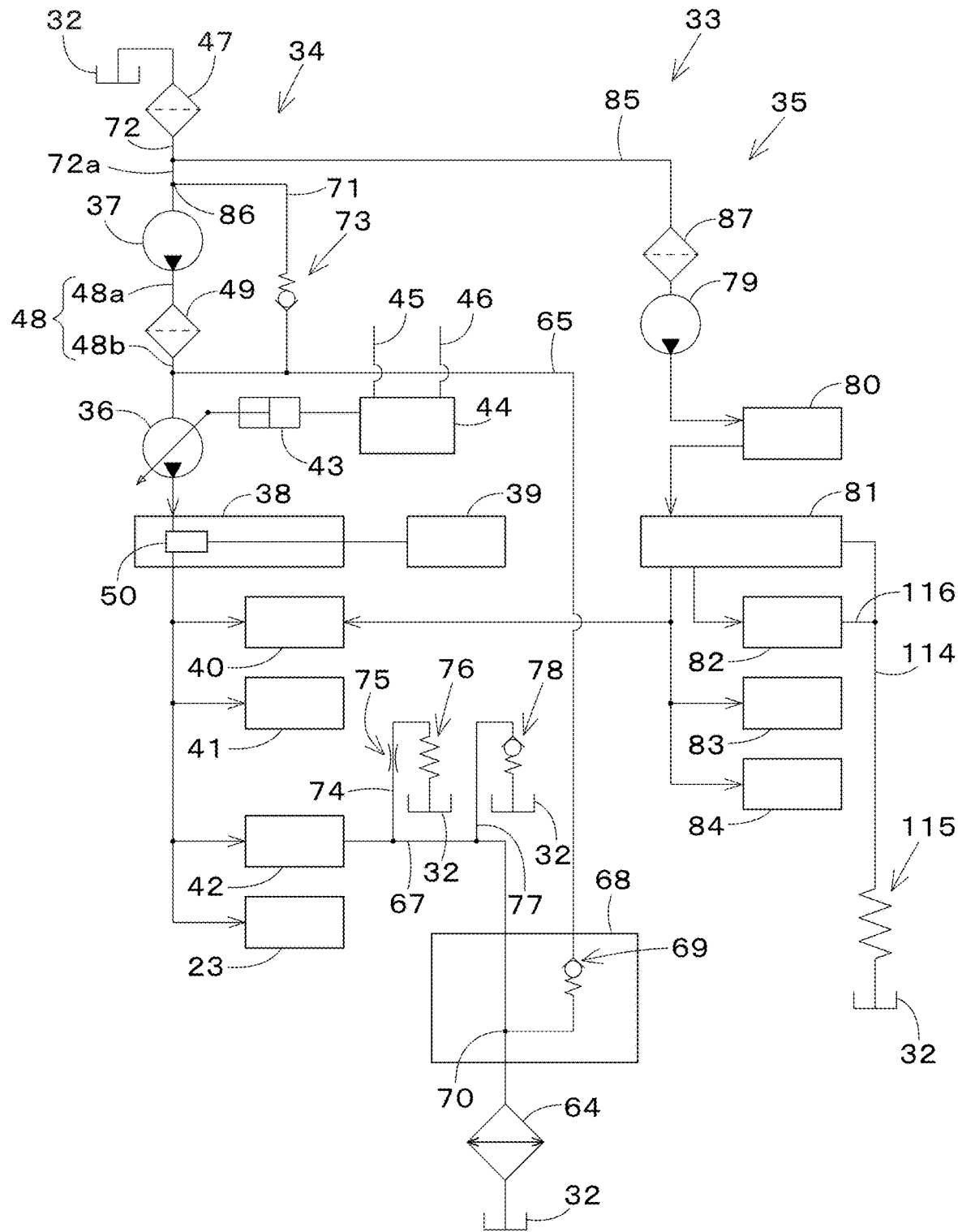
FIG. 1 is a schematic configuration diagram of a whole hydraulic system.

The example embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an example embodiment of the present invention will be described with reference to the drawings as needed.

Figure 9:
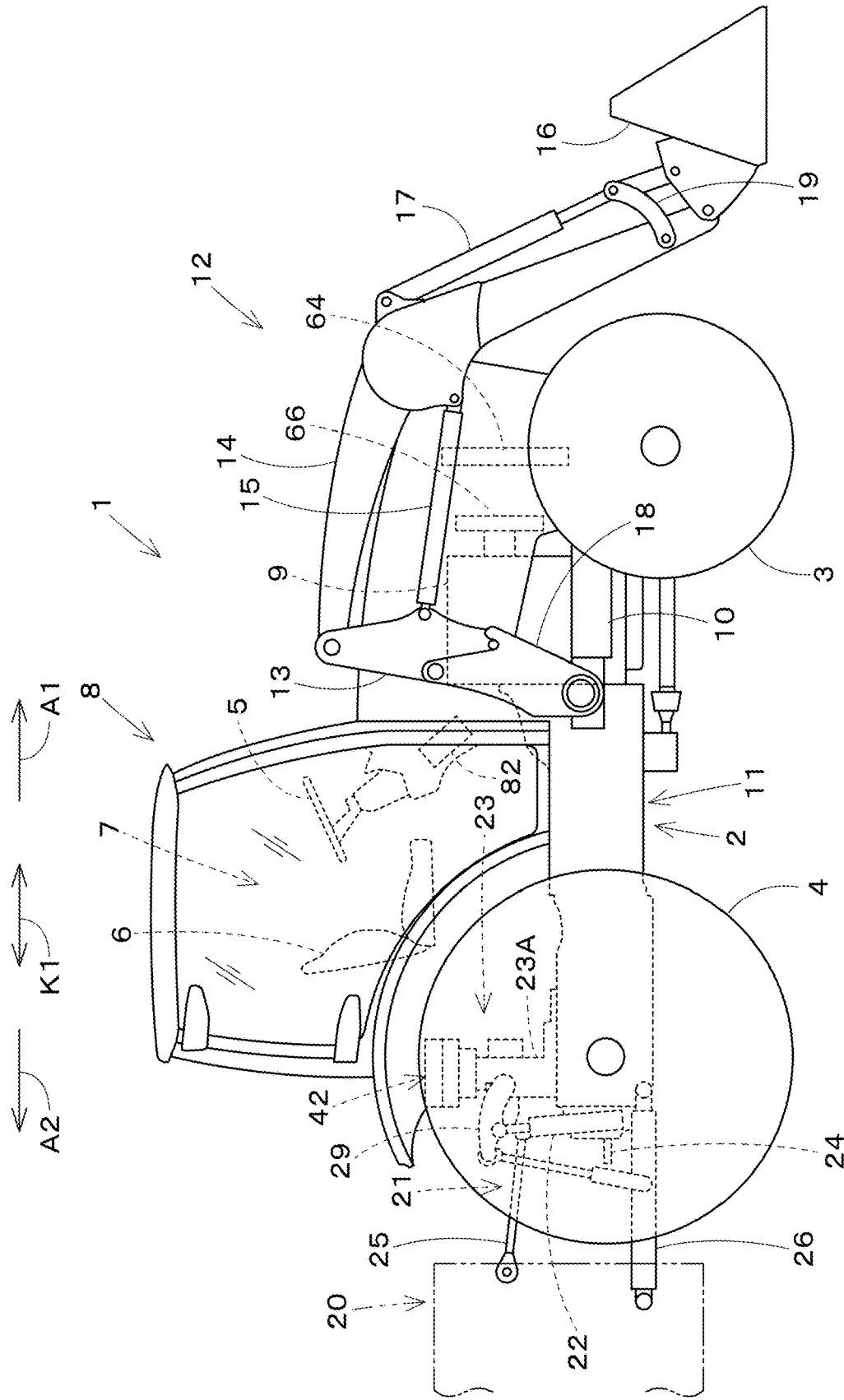
FIG. 9 is a side view of a working vehicle.

FIG. 9 is a schematic side view illustrating the entire configuration of a working vehicle 1 according to the present example embodiment. In the present example embodiment, a tractor is illustrated as the working vehicle 1. Although a description will be given assuming that the working vehicle 1 is a tractor, the working vehicle 1 is not limited to a tractor.

As illustrated in FIG. 9, the tractor 1 includes: a vehicle body 2; front wheels (steered wheels) 3 provided on the left and right of a front portion of the vehicle body 2; rear wheels 4 provided on the left and right of a rear portion of the vehicle body 2; a driving section 7 provided in an upper portion of the vehicle body 2 and including a steering wheel 5 and an operator's seat 6 on which an operator sits; and a cabin 8 which surrounds the driving section 7.

In the following description, the front side (arrow A1 direction of FIG. 9) of the driver sitting on the operator's seat 6 of the tractor 1 is referred to as the forward, the rear side (arrow A2 direction of FIG. 9) of the driver is referred to as the rearward, the left side (the far side of FIG. 9) of the driver is referred to as the leftward, and the right side (the near side of FIG. 9) of the driver is referred to as the rightward. A description will be given assuming that the direction indicated by arrow K1 of FIG. 9 is the front-rear direction. Also, the horizontal direction perpendicular to the front-rear direction is referred to as the vehicle body width direction. Also, the direction which is in the vehicle body width direction and from the central portion of the tractor 1 to the right portion or the left portion is referred to as the vehicle body outward. Also, the direction which is in the vehicle body width direction and from the right portion or the left portion of the tractor 1 to the central portion of the tractor 1 is referred to as the vehicle body inward.

As illustrated in FIG. 9, the vehicle body 2 includes an engine (prime mover) 9 which is a power source, a front frame 10 which is coupled to the engine 9 and protrudes forward from the engine 9, and a transmission case 11 which is coupled to the rear portion of the engine 9 and extends rearward from the engine 9.

In the present example embodiment, the engine 9 is a diesel engine. The engine 9 may be a gasoline engine. Alternatively, the power source may be a prime mover other than the engine 9. For example, the power source may be an electric motor.

The front frame 10 is supported by the left and right front wheels 3, and the transmission case 11 is supported by the left and right rear wheels 4 at a rear portion. In other words, the vehicle body 2 is drivably supported by the left and right front wheels 3 and the left and right rear wheels 4.

As illustrated in FIG. 9, a front working machine 12 is attachable to a front portion of the vehicle body 2, the front working machine 12 being a working machine (implement) to be attached to the front portion of the vehicle body 2. In the present example embodiment, as the front working machine 12, a front loader is illustrated. The front working machine 12 is not limited to a front loader.

The front loader 12 includes a support frame 13, a boom 14, a boom cylinder (working-machine-related hydraulic actuator, or hydraulic actuator of a working machine system) 15, a working tool 16, and a working tool cylinder (working-machine-related hydraulic actuator, or hydraulic actuator of a working machine system) 17. The front loader 12 is coupled to a mounting frame 18 provided in a front portion of the vehicle body 2. The mounting frame 18, the support frame 13, the boom 14, the boom cylinder 15 and the working tool cylinder 17 are provided on the left and right of the vehicle body 2. The boom cylinder 15 and the working tool cylinder 17 each include a double-acting hydraulic cylinder.

The support frame 13 is detachably coupled to the mounting frame 18. The boom 14 is supported by an upper portion of the support frame 13 swingably in a vertical direction about an axis extending in the vehicle body width direction. The boom cylinder 15 is provided across the support frame 13 and the boom 14 to cause the boom 14 to swing by a telescopic operation. In the present example embodiment, a bucket is illustrated as the working tool 16. The working tool 16 is provided between the leading end of the left boom 14 and the leading end of the right boom 14, and swingably coupled to the left and right booms 14 to enable a lifting operation (shovel) and a lowering operation (dump). The working tool cylinder 17 is pivoted at one end to a middle portion of the boom 14, and coupled at the other end to the working tool 16 and the leading end of the boom 14 via a linkage 19 to cause the working tool 16 to swing by a telescopic operation.

Note that as the working tool 16, a manure fork, a pallet fork, a hay fork, a bale fork, a roll grab, and a container bucket and the like may be illustrated.

As illustrated in FIG. 9, a rear working machine 20 is attachable to a rear portion of the vehicle body 2, the rear working machine 20 being a working machine (implement) to be attached to the rear portion of the vehicle body 2. In addition, the vehicle body 2 is provided at the rear portion with a working-machine-attaching mechanism 21 to attach the rear working machine 20 on the vehicle body 2 such that the rear working machine 20 can be raised and lowered, and a working-machine-lifting actuator (working-machine-related hydraulic actuator) 22 to raise and lower the working-machine-attaching mechanism 21.

As the rear working machine 20, a cultivator, a fertilizer spreader, an agricultural chemical spreader, a seed spreader, and a harvester and the like may be illustrated.

Furthermore, the vehicle body 2 is provided at the rear portion with a working-machine-lifting control valve (working-machine-related control valve, or control valve of a working machine system) 23 and a power take off shaft (referred to as a PTO shaft) 24. The working-machine-lifting control valve 23 is a controller that controls the working-machine-lifting actuator 22. The PTO shaft 24 is a shaft for taking out power of the tractor 1 in order to transmit the power from the tractor 1 to the rear working machine 20 and the like.

In the present example embodiment, as the working-machine-attaching mechanism 21, a three-point linkage is illustrated. The working-machine-attaching mechanism 21 is not limited to a three-point linkage. The working-machine-attaching mechanism 21 may be, for example, a two-point linkage.

Figure 4:
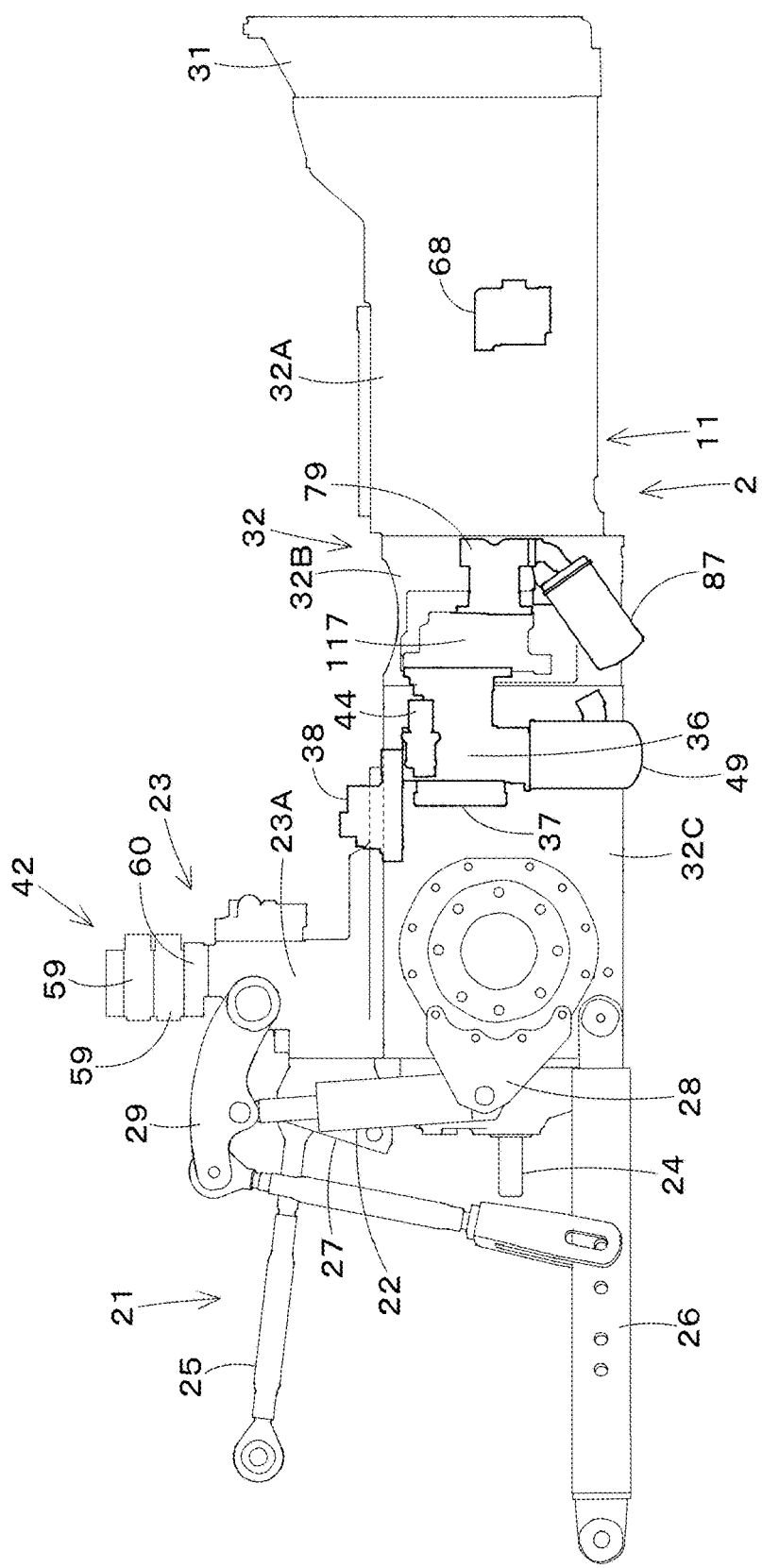
FIG. 4 is a side view of a vehicle body.

As illustrated in FIG. 4, the three-point linkage 21 includes one top link 25, and two left and right lower links 26 located under the top link 25. The front end of the top link 25 is pivotally coupled to a top link bracket 27 provided at a rear portion of the vehicle body 2. The front ends of the left and right lower links 26 are pivotally coupled to a rear lower portion of the vehicle body 2. The rear working machine 20 is coupled to the rear end of the top link 25 and the left and right lower links 26.

The working-machine-lifting actuator 22 includes a single-acting type hydraulic cylinder. The working-machine-lifting actuator 22 is provided on the left and right of a rear portion of the vehicle body 2. Note that two working-machine-lifting actuators 22 are provided in the present example embodiment. However, a structure may be adopted to cause the working-machine-attaching mechanism 21 to raise and lower by one working-machine-lifting actuator 22.

As illustrated in FIG. 4, a lower portion of each working-machine-lifting actuator 22 is pivotally coupled to a bracket member 28 mounted on the vehicle body 2. An upper portion (a leading end portion of a piston rod) of each working-machine-lifting actuator 22 is coupled to a lift arm 29.

A pair of lift arms 29 are provided corresponding to a pair of working-machine-lifting actuators 22, and located on the left and right of the working-machine-lifting control valve 23.

Each lift arm 29 is pivoted at the front portion to a valve case 23A for the working-machine-lifting control valve 23 rotatably about an axis extending in the vehicle body width direction. Each lift arm 29 is coupled via a lift rod 30 at the rear portion to a middle portion of the lower link 26 on the same side with respect to the vehicle body width direction. Therefore, an extension operation of the working-machine-lifting actuators 22 with hydraulic fluid causes the lift arms 29 and the lower links 26 to swing upward to raise the rear working machine 20. At the time of lowering the rear working machine 20, hydraulic fluid is released from the bottom of the working-machine-lifting actuators 22 so that the rear working machine 20 is lowered by its own weight.

As illustrated in FIG. 4, the transmission case 11 includes a housing case 31 coupled to a rear portion of the engine 9, and a transmission case 32 coupled to a rear portion of the housing case 31. The housing case 31 houses a flywheel to stabilize the rotation of the crank shaft of the engine 9.

The transmission case 32 includes a front case 32A, a middle case 32B, and a rear case 32C. In the transmission case 32, a travel-related power transmission device and the like are stored. In the transmission case 32, transmission oil is stored which is lubricating oil for lubricating the travel-related power transmission device and the like. In the tractor 1, the transmission oil is also used as the hydraulic fluid for operating the hydraulic actuators in or on the tractor 1. In other words, the tractor 1 is equipped with hydraulic actuators driven by hydraulic pressure, and the transmission oil is used as the hydraulic fluid for operating the hydraulic actuators. In short, the transmission case 32 is an oil tank (reservoir for hydraulic fluid) in which oil is stored.

FIG. 1 illustrates a simplified configuration diagram of a whole hydraulic system (hydraulic circuit) 33 of the tractor 1. The whole hydraulic system 33 includes a first hydraulic system 34 and a second hydraulic system 35.

First, the first hydraulic system 34 will be described.

The first hydraulic system 34 includes a first hydraulic pump 36, a third hydraulic pump 37, a branch block 38, a trailer brake valve 39, a front suspension valve 40, a front-working-machine control valve (working-machine-related control valve) 41, a hydraulic fluid output unit 42, and the working-machine-lifting control valve 23. In addition, the first hydraulic system 34 includes a load sensing system. In other words, the first hydraulic system 34 uses the load sensing system.

The first hydraulic pump 36 includes a variable displacement hydraulic pump (piston pump). In the first hydraulic pump 36, the delivery flow rate is controlled by load sensing control (control by the load sensing system). The load sensing system controls the delivery flow rate of the variable displacement hydraulic pump such that the differential pressure obtained by subtracting the maximum of the load pressures of a plurality of hydraulic actuators driven by the hydraulic fluid delivered by the hydraulic pump from the delivery pressure of the hydraulic pump is constant.

Figure 2:
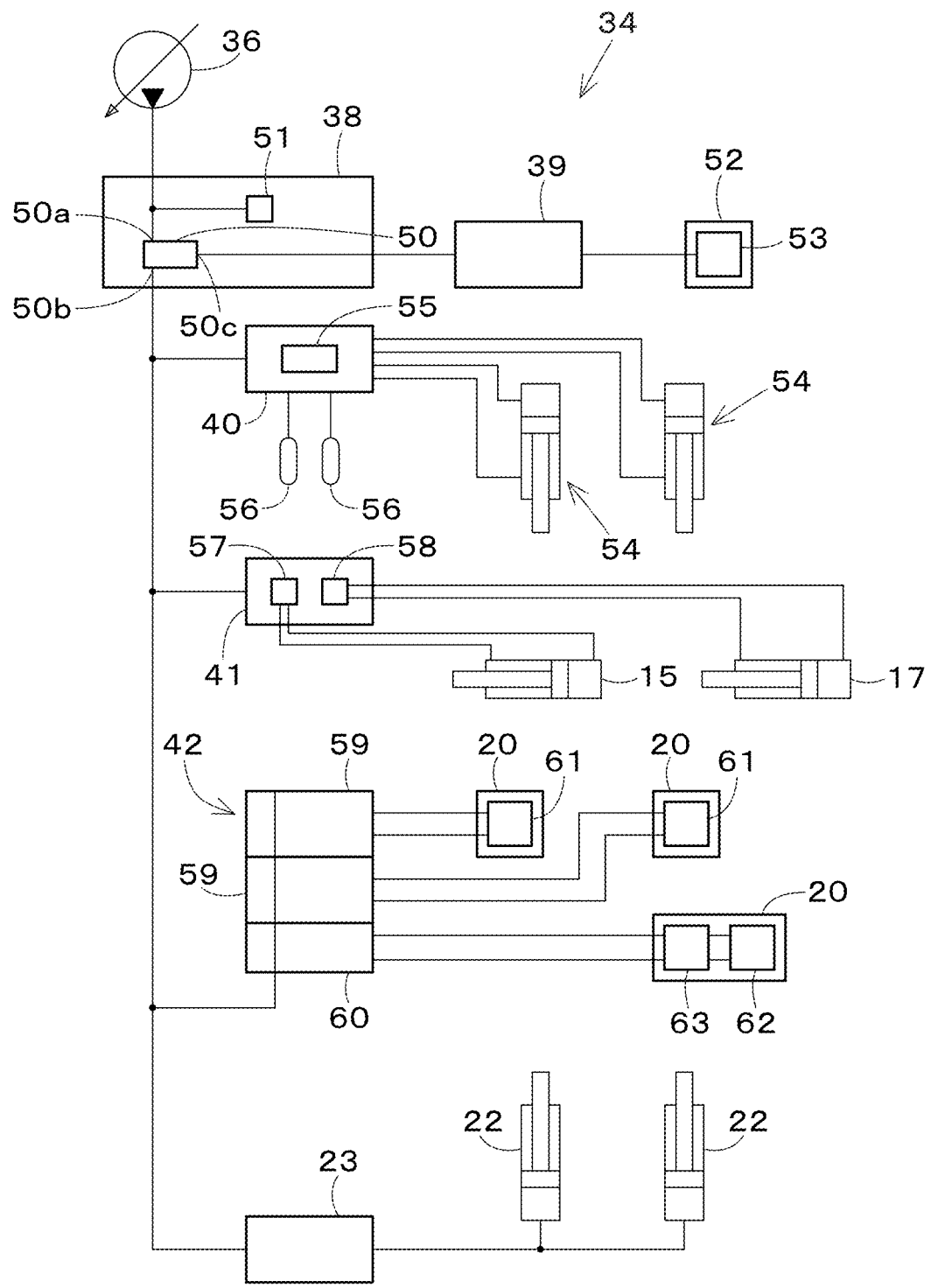
FIG. 2 is a schematic configuration diagram illustrating a first hydraulic system.

In the present example embodiment, as illustrated in FIG. 1, the load sensing system includes a flow rate compensation piston 43 to control the swash plate of the first hydraulic pump 36, an LS regulator valve (flow rate control unit) 44 to control the flow rate compensation piston 43, a PLS signal fluid passage 45 to transmit, to the LS regulator valve 44, a maximum load pressure (an actuator maximum load pressure) among the load pressures of the hydraulic actuators (a brake actuator 53, a suspension cylinder 54, the boom cylinder 15, the working tool cylinder 17, a hydraulic actuator 61, a hydraulic actuator 62 and the working-machine-lifting actuators 22 illustrated in FIG. 2) of the first hydraulic system 34, and a PPS signal fluid passage 46 to transmit the delivery pressure (pump delivery pressure) of the first hydraulic pump 36 to the LS regulator valve 44. In order to achieve a constant differential pressure between the pump delivery pressure and the actuator maximum load pressure, the pressure applied to the flow rate compensation piston 43 is controlled by the LS regulator valve 44, thus performing swash plate control of the first hydraulic pump 36 to control the delivery flow rate of the first hydraulic pump 36, causing necessary hydraulic power for the load to be delivered from the first hydraulic pump 36.

In the present example embodiment, the first hydraulic pump 36 is configured such that the swash plate is pressed by the self-pressure of the first hydraulic pump 36 in a direction in which the pump flow rate increases. The flow rate compensation piston 43 is configured such that a force against the self-pressure is applied to the swash plate. The delivery flow rate of the first hydraulic pump 36 is controlled by controlling the pressure applied to the flow rate compensation piston 43. Therefore, when the pressure applied to the flow rate compensation piston 43 is released, the first hydraulic pump 36 achieves MAX swash plate angle, and delivers a maximum flow rate.

Also, in the load sensing system, when multiple hydraulic actuators provided in the first hydraulic system 34 are operated at the same time, regardless of the magnitude of load, the flow rate (is proportionally distributed) is determined according to the amount of operation.

As illustrated in FIG. 4, the LS regulator valve 44 is mounted on an upper portion of the first hydraulic pump 36.

The third hydraulic pump 37 includes a trochoid pump. As illustrated in FIG. 1, the third hydraulic pump 37 is located upstream of the first hydraulic pump 36, and sucks hydraulic fluid from the reservoir 32 through an oil filter 47, and delivers the hydraulic fluid to the first hydraulic pump 36. In other words, the third hydraulic pump 37 is a charge hydraulic pump to supply hydraulic fluid to the first hydraulic pump 36. In other words, the third hydraulic pump 37 is a hydraulic pump that supports the suction of hydraulic fluid by applying pressure to the suction side of the first hydraulic pump 36. As illustrated in FIG. 4, the third hydraulic pump 37 is mounted on a rear portion of the first hydraulic pump 36.

An oil filter 49 is provided in a hydraulic passage 48 between the third hydraulic pump 37 and the first hydraulic pump 36. Therefore, the hydraulic passage 48 includes a first fluid passage 48a between the third hydraulic pump 37 and the oil filter 49, and a second fluid passage 48b between the oil filter 49 and the first hydraulic pump 36.

As illustrated in FIG. 1, the branch block 38 is located downstream (delivery side) of the first hydraulic pump 36, and hydraulic fluid is supplied from the first hydraulic pump 36 to the branch block 38.

As illustrated in FIG. 2, the branch block 38 is provided with a priority valve 50. Even when pressure fluctuation occurs in an input port 50a at the entry of hydraulic fluid, and a first output port 50b and a second output port 50c at the exit of hydraulic fluid, the priority valve 50 preferentially delivers a constant flow rate to the second output port 50c, and delivers an excess flow rate to the first output port 50b. In other words, a constant flow rate is preferentially delivered from the priority valve 50 to the trailer brake valve 39. As illustrated in FIG. 4, the branch block 38 is mounted on an upper portion of the first hydraulic pump 36.

Note that the branch block 38 is provided with a relief valve 51 that sets a relief pressure for the first hydraulic pump 36. The relief valve 51 is connected upstream of the priority valve 50. The set pressure of the relief valve 51 is, for example, about 31.0 MPa.

As illustrated in FIG. 2, the trailer brake valve 39 controls the braking force of a hydraulic brake system 52 of a vehicle towed by the tractor 1. The hydraulic brake system 52 includes, for example, a rotational member that rotates together with the wheels of the towed vehicle, a press member that is pressed against the rotational member, and a brake actuator 53 including a brake piston that presses the press member against the rotational member and a piston container that contains the brake piston therein. The braking force of the hydraulic brake system 52 is controlled by the hydraulic force of hydraulic fluid supplied from the trailer brake valve 39 to the brake actuator 53.

As illustrated in FIG. 2, the front suspension valve 40 controls the left and right (pair of) suspension cylinders 54 respectively corresponding to the left and right front wheels 3.

Specifically, the front suspension valve 40 includes a control valve 55 switchable to a neutral position, raised position, or lowered position, and when the control valve 55 is operated in the neutral position, the suspension cylinder 54 extends and contracts according to the irregularities of the ground, and hydraulic fluid flows back and forth between an oil chamber of the suspension cylinder 54 and an accumulator 56, thus the suspension cylinder 54 operates as a suspension mechanism with a spring constant.

When the control valve 55 is operated in the raised position, hydraulic fluid is supplied from the control valve 55 to the suspension cylinder 54, causing the suspension cylinder 54 to extend, and the front portion of the vehicle body 2 (working vehicle 1) is raised. Subsequently, when the control valve 55 is operated in the neutral position, the suspension cylinder 54 operates as a suspension mechanism with the suspension cylinder 54 extended.

Furthermore, when the control valve 55 is operated in the lowered position, hydraulic fluid is supplied from the control valve 55 to the suspension cylinder 54, causing the suspension cylinder 54 to contract, and the front portion of the vehicle body 2 (working vehicle 1) is lowered. Subsequently, when the control valve 55 is operated in the neutral position, the suspension cylinder 54 operates as a suspension mechanism with the suspension cylinder 54 contracted.

Note that a switching operation of the control valve 55 is performed by hydraulic fluid, and as illustrated in FIG. 1, hydraulic fluid for control pressure to switch the control valve 55 is supplied from an OC regulator 81 of the second hydraulic system 35 to the front suspension valve 40.

The front suspension has a required flow rate of 2.5 L/min which is low, but due to its high pressure, placing the front suspension in the load sensing system produces a high energy saving effect. When the front suspension is provided in an open center system, a diversion valve and a gear pump with increased displacement are necessary, but they are unnecessary in the present example embodiment.

The front-working-machine control valve 41 controls the boom cylinder (working-machine-related hydraulic actuator) 15 of the front loader (front working machine) 12, and the working tool cylinder (working-machine-related hydraulic actuator) 17. Specifically, as illustrated in FIG. 2, the front-working-machine control valve 41 includes a boom control valve 57, and a working tool control valve 58. The boom control valve 57 controls the boom cylinder 15 so that the boom cylinder 15 extends and contracts. The working tool control valve 58 controls the working tool cylinder 17 so that the working tool cylinder 17 extends and contracts.

As illustrated in FIG. 2, the hydraulic fluid output unit 42 includes an auxiliary control valve (working-machine-related control valve) 59, and a hydraulic outlet (power beyond) 60.

As illustrated in FIG. 4, the hydraulic fluid output unit 42 is located above the working-machine-lifting control valve 23. The hydraulic outlet 60 is formed in a block shape, and mounted on the working-machine-lifting control valve 23. In the present example embodiment, two auxiliary control valves 59 are provided, and stacked and mounted on the hydraulic outlet 60 in the vertical direction. Three or more auxiliary control valves 59 may be stacked and mounted. Alternatively, only one auxiliary control valve 59 may be mounted.

For example, when the hydraulic actuator (working-machine-related hydraulic actuator) 61, such as a hydraulic cylinder and a hydraulic motor, is mounted on the rear working machine (working machine) 20 attached to the working-machine-attaching mechanism 21, the auxiliary control valve 59 can control the hydraulic actuator 61. Note that the auxiliary control valve 59 is usable not only when the hydraulic actuator 61 mounted on the rear working machine 20 is controlled, but also when a working machine equipped with a hydraulic actuator and not equipped with a control valve to control the hydraulic actuator is mounted on the tractor 1. The auxiliary control valve 59 can also be used to cause the hydraulic top link 25 equipped with a hydraulic cylinder to perform a telescopic operation.

As illustrated in FIG. 2, for example, when the hydraulic actuator (working-machine-related hydraulic actuator) 62, such as a hydraulic cylinder and a hydraulic motor, and an external control valve (working-machine-related control valve) 63 that controls the hydraulic actuator 62 are provided in or on the rear working machine (working machine) 20 mounted on the working-machine-attaching mechanism 21, the hydraulic outlet 60 can take out hydraulic fluid to supply the hydraulic fluid to the external control valve 63 of the rear working machine 20. Note that the hydraulic outlet 60 is usable not only when hydraulic fluid is taken out for the external control valve 63 mounted on the rear working machine 20, but also when a working machine equipped with the hydraulic actuator 62 and the external control valve 63 that controls the hydraulic actuator 62 is mounted on the tractor 1.

As illustrated in FIG. 2, the working-machine-lifting control valve (working-machine-related control valve) 23 causes the working-machine-lifting actuator (working-machine-related hydraulic actuator) 22 to extend by supplying hydraulic fluid to the bottom of the working-machine-lifting actuator 22, thus raises the rear working machine 20. At the time of lowering the rear working machine 20, hydraulic fluid is released from the bottom of the working-machine-lifting actuators 22 so that the rear working machine 20 is lowered by its own weight. The rear working machine 20 can be maintained at a predetermined height position by not draining hydraulic fluid from the working-machine-lifting actuators 22.

As illustrated in FIG. 1, the first hydraulic system 34 includes a return passage 65 branching from the hydraulic passage 48 and connected to an oil cooler 64. The return passage 65 allows an excess of hydraulic fluid, which flows from the third hydraulic pump 37 to the first hydraulic pump 36, to return to the reservoir 32 through the oil cooler 64. In the present example embodiment, the return passage 65 branches from a position downstream of the oil filter 49, specifically, from the second fluid passage 48*b* in the hydraulic passage 48.

As illustrated in FIG. 9, the oil cooler 64 is located forward of the engine 9. The hydraulic fluid in the oil cooler 64 is cooled by the cooling air of a cooling fan 66 driven by the power of the engine 9, and is returned to the reservoir 32 (transmission case 32) after cooling. As illustrated in FIG. 1, the first hydraulic system 34 includes a feedback passage 67 to allow hydraulic fluid returned from the working-machine-related hydraulic actuator to flow therethrough and connected to the return passage 65. Specifically, the feedback passage 67 merges the hydraulic fluid returned from the auxiliary control valve 59 and the hydraulic outlet 60 with the hydraulic fluid which flows through the return passage 65.

The feedback passage 67 is connected to the return passage 65 in a merge block (merge section) 68. As illustrated in FIG. 4, the merge block 68 is mounted on a lateral surface of the front case 32A.

As illustrated in FIG. 1, the merge block 68 is provided with a check valve 69. The check valve 69 is provided in the return passage 65 at a location upstream of a junction 70 between the feedback passage 67 and the return passage 65.

The check valve 69 prevents backflow of hydraulic fluid from the junction 70 toward the third hydraulic pump 37.

As illustrated in FIG. 1, the first hydraulic system 34 includes a drain passage 71 which is different from the return passage 65. The drain passage 71 is connected to the return passage 65 at one end, and to a suction passage 72 between the reservoir 32 and the third hydraulic pump 37 at the other end. Specifically, one end of the drain passage 71 is connected to the return passage 65 upstream of the check valve 69, and the other end of the drain passage 71 is connected to an interval fluid passage 72a between the oil filter 47 and the third hydraulic pump 37 on the suction passage 72. The drain passage 71 is provided with a relief valve 73 for the third hydraulic pump 37. The relief valve 73 sets the relief pressure of the third hydraulic pump 37. In other words, the relief valve 73 allows hydraulic fluid to flow from one end to the other end. The excess flow of hydraulic fluid from the third hydraulic pump 37 to the first hydraulic pump 36 can be drained into the reservoir 32 through the relief valve 73. The set pressure of the relief valve 73 is, for example, about 0.4 MPa.

In contrast, the set pressure of the check valve 69 is about 0.02 MPa, for example. In short, the set pressure of the check valve 69 is set lower than the set pressure of the relief valve 73. Therefore, the excess flow of the third hydraulic pump 37 preferentially flows through the return passage 65.

As illustrated in FIG. 1, the feedback passage 67 is connected to a lubricating oil passage 74. The lubricating oil passage 74 supplies returned hydraulic fluid flowing through the feedback passage 67 to a lubrication section (such as a brake disk) 76 in the brake system for the rear wheels through a squeezer 75. The feedback passage 67 is connected to a relief fluid passage 77. The relief fluid passage 77 is provided with a protection relief valve 78 for protection of the oil cooler 64. The set pressure of the protection relief valve 78 is about 0.5 MPa, for example.

Meanwhile, in the load sensing system, when a hydraulic actuator is not used, a variable displacement pump does not deliver hydraulic fluid. Thus, when the return passage 65 as in the present example embodiment is not provided, a trochoid pump to cool hydraulic fluid needs to be provided separately. Then the total amount of suction of pumps becomes excessive, or a problem arises in cost, and installation space.

In the present example embodiment, attention is focused on the excess flow of the third hydraulic pump 37 (charge hydraulic pump), and cooling of hydraulic fluid can be achieved by providing the return passage 65 to allow the excess flow of the third hydraulic pump 37 to flow through the oil cooler 64 without separately providing a pump for cooling. With this, the whole hydraulic system 33 can be made compact.

Since the excess flow of the third hydraulic pump 37 has a large flow rate, even in an engine low rotation region where the frequency of use increases in a load sensing system, the flow rate is easily ensured. However, when the first hydraulic pump 36 is used, the excess flow of hydraulic fluid delivered from the third hydraulic pump 37 decreases, thus introducing the hydraulic fluid returned from the auxiliary control valve 59 and the hydraulic outlet 60 to the oil cooler 64 through the feedback passage 67 enables the cooling performance to be ensured even at the time of continuous use for the auxiliary control valve 59 and the hydraulic outlet 60.

Next, the second hydraulic system 35 will be described.

As illustrated in FIG. 1, the second hydraulic system 35 includes a second hydraulic pump 79, an adjustable tread valve 80, the OC regulator 81, a power steering controller 82, a power shift valve 83, and a PTO clutch valve 84.

The second hydraulic pump 79 includes a fixed displacement gear pump. The second hydraulic system 35 is constructed in an open center system. A passage 85 on the suction side of the second hydraulic pump 79 is connected upstream of a junction 86 with the feedback passage 67 on the interval fluid passage 72a. The suction side of the second hydraulic pump 79 is provided with an oil filter 87.

Delivery hydraulic fluid of the second hydraulic pump 79 is input to the adjustable tread valve 80, and the hydraulic fluid output from the adjustable tread valve 80 is input to the OC regulator 81.

Figure 3:
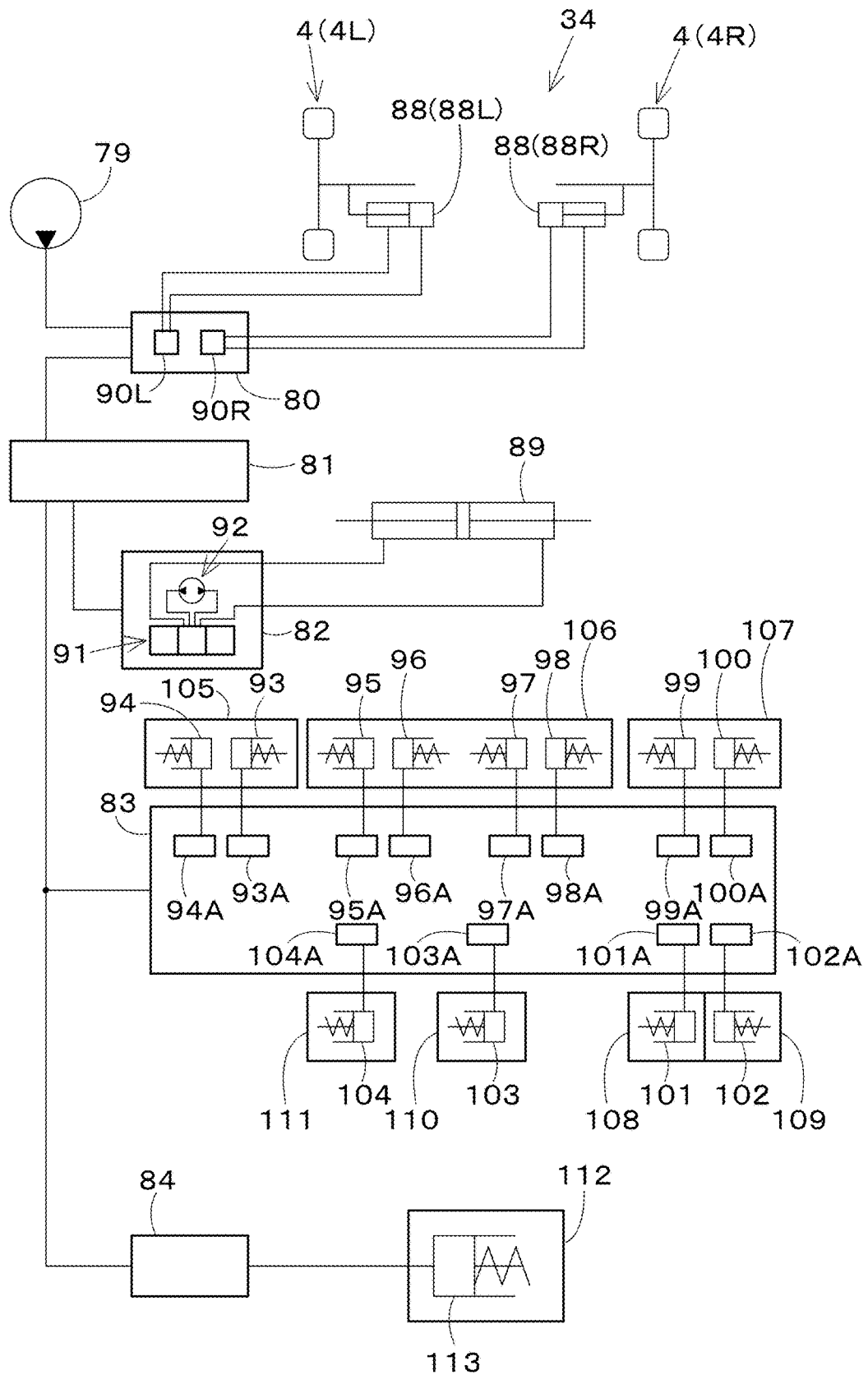
FIG. 3 is a schematic configuration diagram illustrating a second hydraulic system.

As illustrated in FIG. 3, the adjustable tread valve 80 controls (extends and contracts) left and right tread cylinders 88 that adjust the tread width of the rear wheels 4. Each tread cylinder 88 includes a hydraulic cylinder which is telescopic in the vehicle body width direction. A left tread cylinder 88L is for a left rear wheel 4L, and a right tread cylinder 88R is for a right rear wheel 4R. The adjustable tread valve 80 includes a control valve 90L that controls the left tread cylinder 88L, and a control valve 90R that controls the right tread cylinder 88R.

When the left and right tread cylinders 88L and 88R are extended, the left and right rear wheels 4L and 4R move in a direction in which the tread width increases, and when the left and right tread cylinders 88L and 88R are contracted, the left and right rear wheels 4L and 4R move in a direction in which the tread width decreases.

A high-pressure hydraulic fluid is input to the OC regulator 81 from the adjustable tread valve 80. The OC regulator 81 supplies high-pressure hydraulic fluid to the power steering controller 82, and distributes the input hydraulic fluid so that the hydraulic fluid for control pressure is supplied to the power shift valve 83, the PTO clutch valve 84 and the front suspension valve 40.

As illustrated in FIG. 9, the power steering controller 82 is located forward and downward of the steering wheel 5.

As illustrated in FIG. 3, the power steering controller 82 controls a steering cylinder (steering-related hydraulic actuator, or hydraulic actuator of a steering system) 89 that performs a steering operation on the left and right front wheels 3. Specifically, the power steering controller 82 includes a steering valve 91 that switches the direction of flow of hydraulic fluid by being operated by the steering wheel 5, and a metering pump 92 that measures the amount of fluid according to the degree of rotation of the steering wheel 5, and supplies the fluid to the steering cylinder 89.

As illustrated in FIG. 3, the power shift valve 83 controls traveling-power-transmission-related hydraulic actuator(s) (which may be referred to as hydraulic actuator(s) of a traveling power transmission system) (including speed-change-related actuator(s), or actuator(s) of a speed change system). The traveling-power-transmission-related hydraulic actuators include a forward travel hydraulic actuator 93, a rearward travel hydraulic actuator 94, a first speed stage hydraulic actuator 95, a second speed stage hydraulic actuator 96, a third speed stage hydraulic actuator 97, a fourth speed stage hydraulic actuator 98, a high-speed hydraulic actuator 99, a low-speed hydraulic actuator 100, a first front wheel drive hydraulic actuator 101, a second front wheel drive hydraulic actuator 102, a rear wheel differential lock hydraulic actuator 103, and a front wheel differential lock hydraulic actuator 104.

The forward travel hydraulic actuator 93 switches a forward/rearward travel switching device 105 to a state where power for forward travel is transmitted, the forward/ rearward travel switching device 105 being configured to switch the power from the engine 9 between power for forward travel and power for rearward travel. The rearward travel hydraulic actuator 94 switches the forward/rearward travel switching device 105 to a state where power for rearward travel is transmitted.

The first speed stage hydraulic actuator 95 switches a main transmission 106 to a first speed state, the main transmission 106 being configured to change the travel power from the forward/rearward travel switching device 105 to one of four stages from first speed to fourth speed. The second speed stage hydraulic actuator 96 switches the main transmission 106 to a second speed state. The third speed stage hydraulic actuator 97 switches the main transmission 106 to a third speed state. The fourth speed stage hydraulic actuator 98 switches the main transmission 106 to a fourth speed state.

The high-speed hydraulic actuator 99 switches a sub transmission 107 to a high-speed state, the sub transmission 107 being configured to change the travel power from the main transmission 106 to one of high and low stages. The low-speed hydraulic actuator 100 switches the sub transmission 107 to a low-speed state.

The first front wheel drive hydraulic actuator 101 switches a first front wheel drive device 108 between a state where the front wheels 3 are driven and a state where the front wheels 3 are not driven. The first front wheel drive device 108 transmits, to the front wheels 3, power branched from the power transmitted from the sub transmission 107 to the rear wheels 4, and decelerates and transmits the power for front wheel drive to the front wheels 3 so that the left and right front wheels 3 and the left and right rear wheels 4 are driven at the same peripheral speed.

The second front wheel drive hydraulic actuator 102 switches a second front wheel drive device 109 between a state where the front wheels 3 are driven and a state where the front wheels 3 are not driven. The second front wheel drive device 109 transmits, to the front wheels 3, power branched from the power transmitted from the sub transmission 107 to the rear wheels 4, and accelerates and transmits the power for front wheel drive to the front wheels 3 so that the left and right front wheels 3 are driven at a peripheral speed which is approximately twice the peripheral speed of the left and right rear wheels 4.

The rear wheel differential lock hydraulic actuator 103 operates a rear wheel differential lock mechanism 110 that locks a rear wheel differential that distributes the travel power to the left and right rear wheels 4, while allowing the differential between the left and right rear wheels 4.

The front wheel differential lock hydraulic actuator 104 operates a front wheel differential lock mechanism 111 that locks a front wheel differential that distributes the travel power to the left and right front wheels 3, while allowing the differential between the left and right front wheels 3.

The power shift valve 83 includes a forward travel control valve 93A that controls the forward travel hydraulic actuator 93, a rearward travel control valve 94A that controls the rearward travel hydraulic actuator 94, a first speed control valve 95A that controls the first speed stage hydraulic actuator 95, a second speed control valve 96A that controls the second speed stage hydraulic actuator 96, a third speed control valve 97A that controls the third speed stage hydraulic actuator 97, a fourth speed control valve 98A that controls the fourth speed stage hydraulic actuator 98, a high-speed control valve 99A that controls the high-speed hydraulic actuator 99, a low-speed control valve 100A that controls the low-speed hydraulic actuator 100, a first front wheel drive control valve 101A that controls the first front wheel drive hydraulic actuator 101, a second front wheel drive control valve 102A that controls the second front wheel drive hydraulic actuator 102, a rear wheel differential lock control valve 103A that controls the rear wheel differential lock hydraulic actuator 103, and a front wheel differential lock control valve 104A that controls the front wheel differential lock hydraulic actuator 104. Note that the power shift valve 83 may include a control valve that controls other traveling-power-transmission-related hydraulic actuators.

As illustrated in FIG. 3, the PTO clutch valve 84 controls a PTO hydraulic actuator 113 that operates a PTO clutch 112 to control the connection and disconnection of the PTO clutch 112. The PTO clutch 112 connects and disconnects PTO system power to transmit the power from the engine 9 to the PTO shaft 24.

As illustrated in FIG. 1, the second hydraulic system 35 is provided with a lubricating oil passage 114 to supply hydraulic fluid from the OC regulator 81 to a traveling-power-transmission-related lubrication section (such as a disk) 115. The lubricating oil passage 114 is connected to a returning fluid passage 116 for passing hydraulic fluid returned from the power steering controller 82.

In the whole hydraulic system 33 including the above-described configuration, since the first hydraulic system 34 using a load sensing system and the second hydraulic system 35 using an open center system are used in combination, the whole hydraulic system can be made compact as compared to when the whole hydraulic system is based entirely on a load sensing system. Since a whole hydraulic system is compact, it is possible to provide a working vehicle 1 which have a compact structure.

The load sensing system has a characteristic that when a maximum flow rate of the pump is used up by an operation of hydraulic actuators at the same time, hydraulic fluid is preferentially supplied to a hydraulic actuator with a low load. Thus, if the hydraulic actuators of the first hydraulic system 34 and the hydraulic actuators of the second hydraulic system 35 are assumed to be provided in a load sensing system, for example, when a large flow rate with low load is used by the working-machine-lifting actuator 22, there is a possibility that supply of hydraulic fluid to the traveling power transmission system and the steering system may become insufficient. In order to avoid this, a configuration may be adopted in which multiple priority valves are mounted and when the delivery flow rate of the pump is saturated, hydraulic fluid is supplied to the multiple valves in the order of high priority. However, by doing so, a problem arises in that the number of priority valves increases.

In the present example embodiment, the traveling power transmission system and the steering system are provided in the second hydraulic system 35 constructed in an open center system, thus the problem of insufficient supply of hydraulic fluid to the traveling power transmission system and the steering system as mentioned above does not occur, and the problem of an increased number of priority valves also does not arise. In the present example embodiment, the number of priority valves is small (for example, one in the present example embodiment), thus the branch block 38, which is a member with the built-in priority valve 50, can also have a compact structure. The number of priority valves through which hydraulic fluid flows is small, thus providing advantages in pressure loss and responsiveness.

Figure 5:
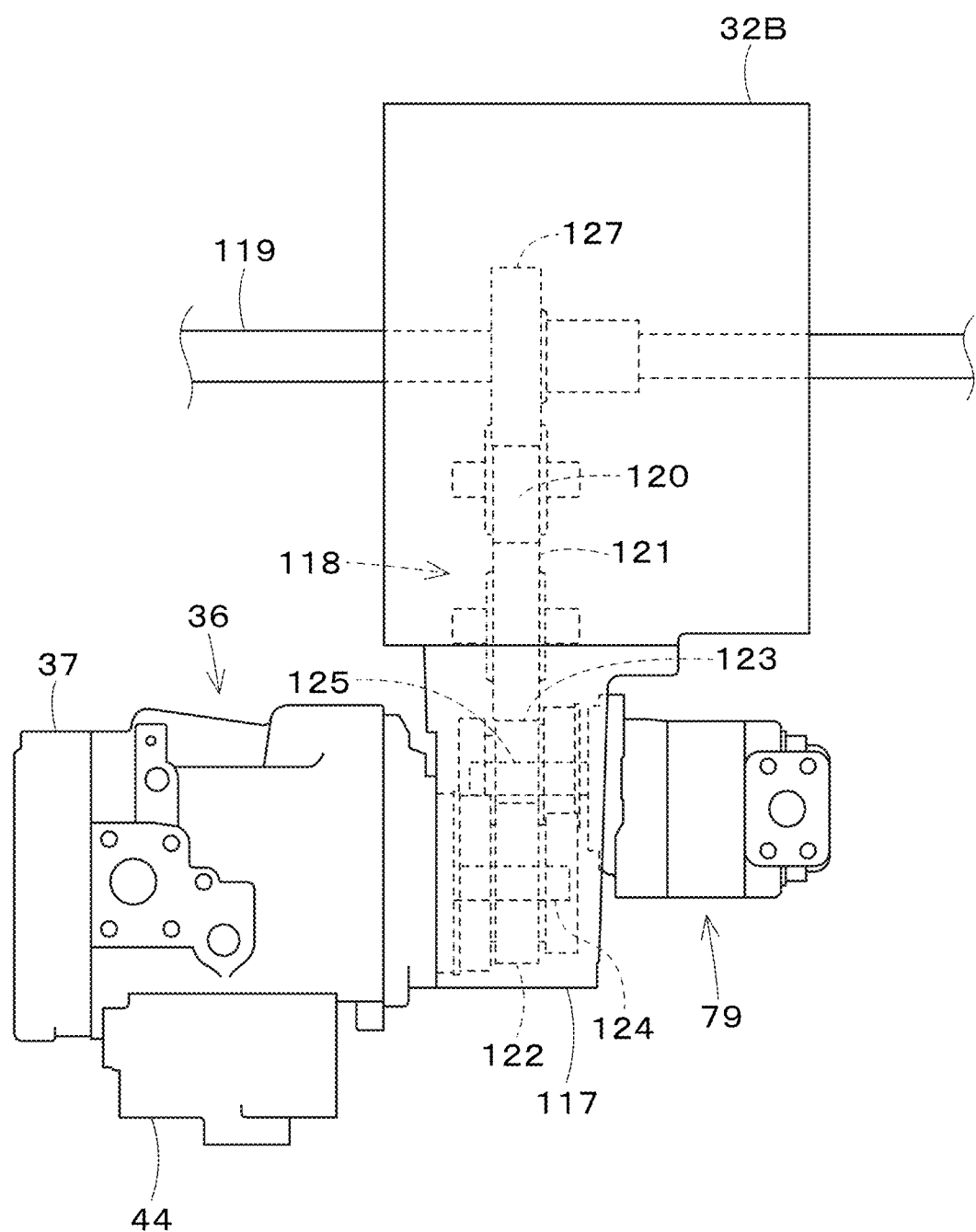
FIG. 5 is a plan view of an arrangement section for a first hydraulic pump and a second hydraulic pump.
Figure 8:
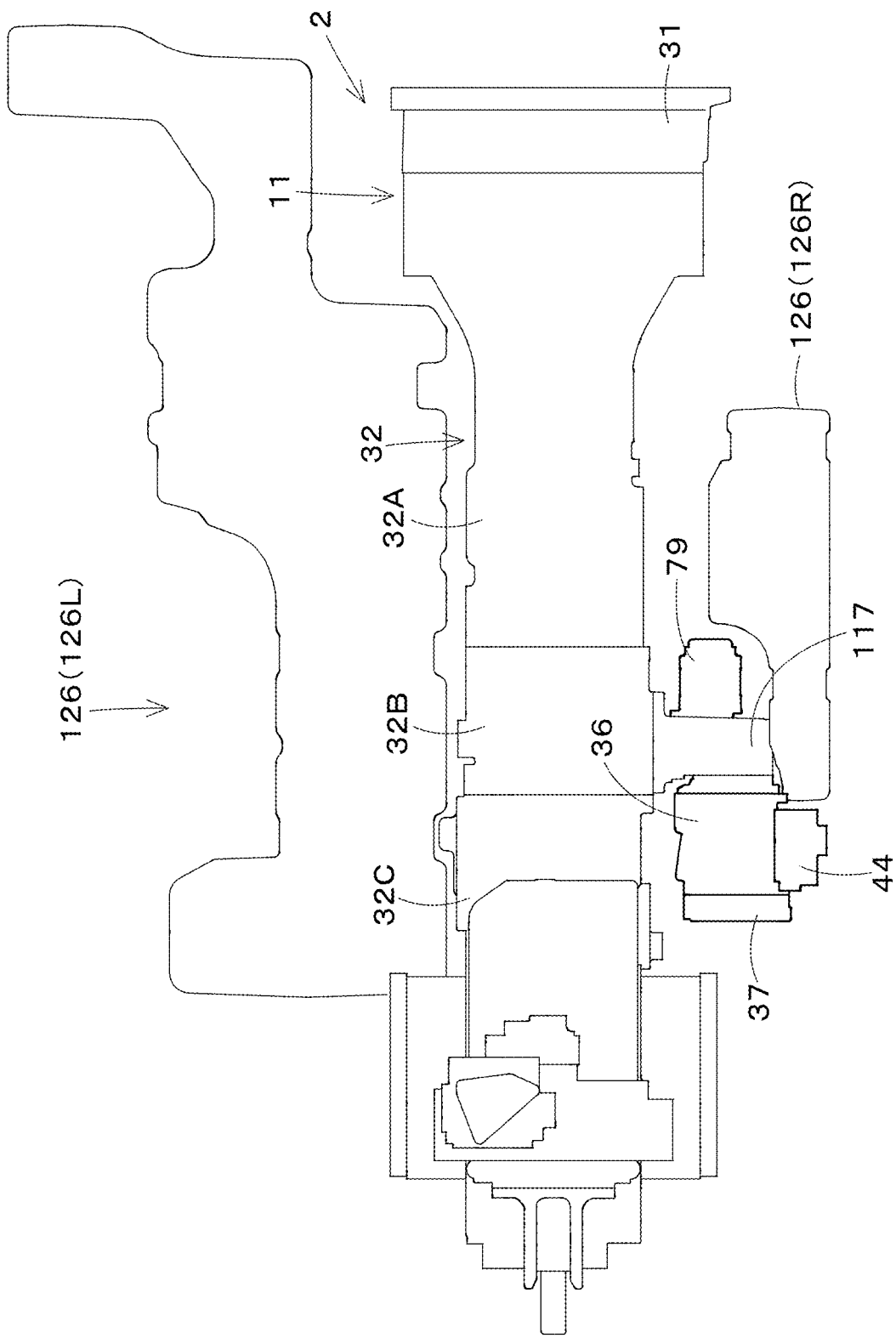
FIG. 8 is a plan view of a vehicle body and a fuel tank.

As illustrated in FIGS. 4 and 8, the first hydraulic pump 36 and the second hydraulic pump 79 are provided on one side of (on the right side of) an intermediate portion of the transmission case 32 in the front-rear direction. Specifically, as illustrated in FIG. 5, the first hydraulic pump 36 and the second hydraulic pump 79 are mounted on a gear case (transmission mechanism case) 117 mounted on the lateral surface (right lateral surface) of the middle case 32B. The first hydraulic pump 36 is located rearward of the gear case 117, and the second hydraulic pump 79 is located forward of the gear case 117. In other words, the first hydraulic pump 36 and the second hydraulic pump 79 are arranged in a front-rear direction with the gear case (gear transmission mechanism 118) 117 interposed therebetween.

As illustrated in FIG. 5, the gear case 117 stores and supports the gear transmission mechanism 118 (transmission mechanism) that transmits the power from the transmission shaft 119 housed in the vehicle body 2 to the first hydraulic pump 36 and the second hydraulic pump 79. The transmission shaft 119 extends in the front-rear direction within the vehicle body 2 (middle case 32B). In the present example embodiment, the transmission shaft 119 is a PTO propeller shaft to transmit the power from the engine 9 to the PTO shaft 24.

Figure 6:
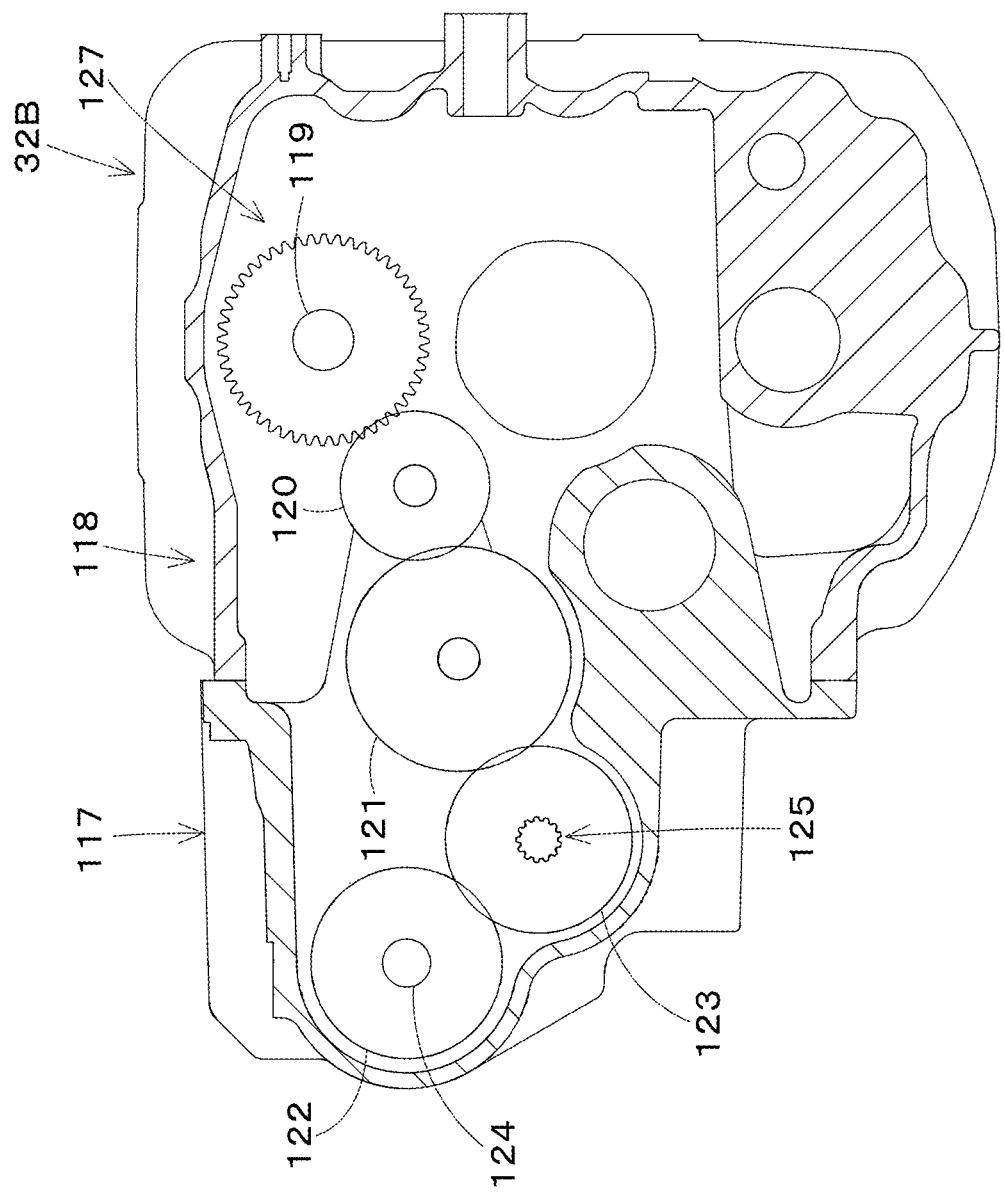
FIG. 6 is a front sectional view of a gear transmission mechanism.
Figure 7:
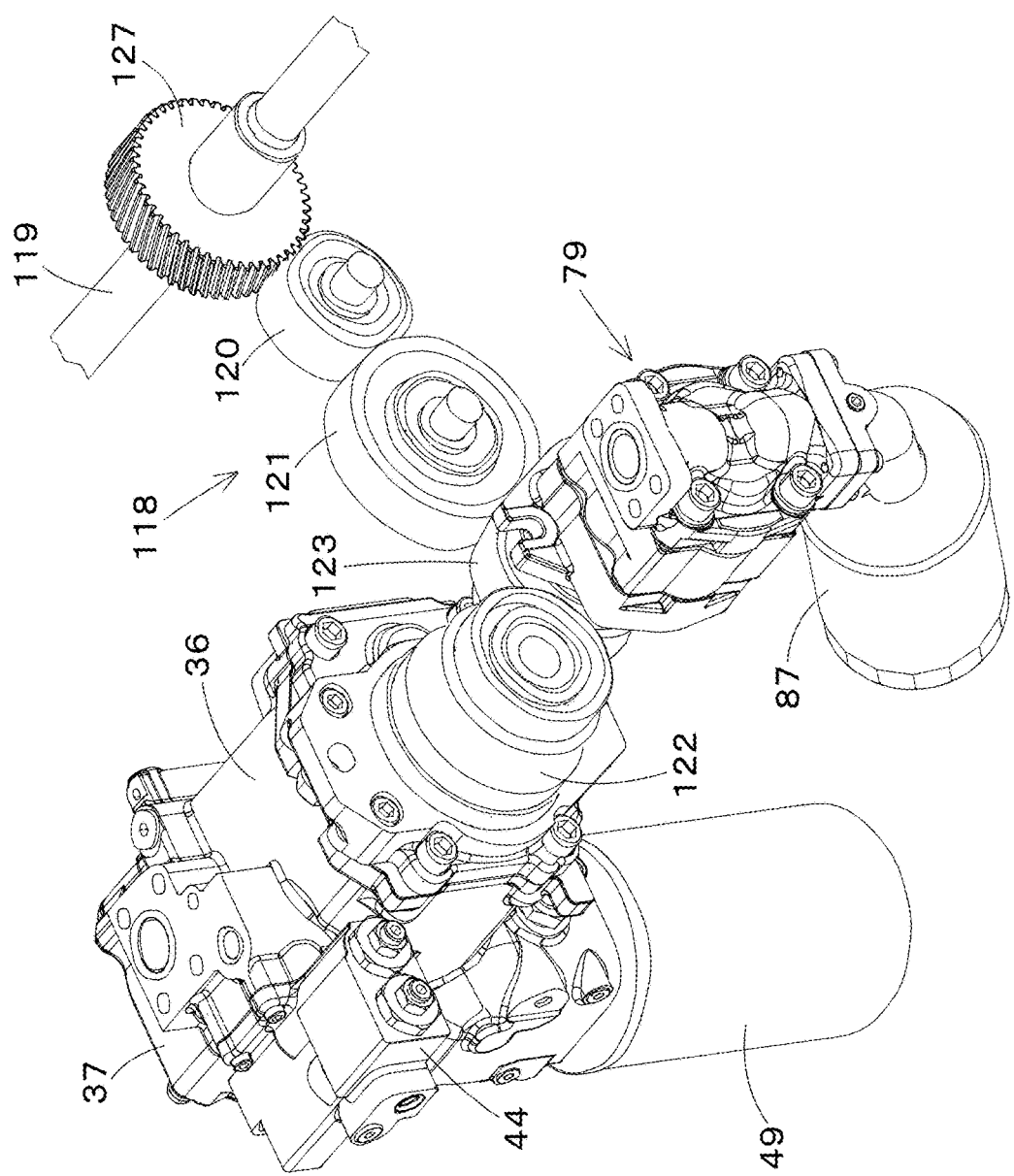
FIG. 7 is a perspective view of the first hydraulic pump, the second hydraulic pump, and the gear transmission mechanism.

As illustrated in FIGS. 5, 6, and 7, the gear transmission mechanism 118 includes a transmission gear 127, a first idle gear 120, a second idle gear 121, a first pump gear 122, and a second pump gear 123. The transmission gear 127, the first idle gear 120, the second idle gear 121, the second pump gear 123 and the first pump gear 122 are arranged in this order along the vehicle body width direction sideways (rightward) from the vehicle body 2 (the middle case 32B). In other words, the gear transmission mechanism 118 that transmits power from the transmission shaft 119 includes a plurality of gears arranged sideways (i.e., in a lateral direction) from the vehicle body 2.

The first pump gear 122 is the gear farthest from the vehicle body 2, and the second pump gear 123 is closer to the vehicle body 2 than the first pump gear 122. In other words, the gear transmission mechanism 118 includes the first pump gear 122 that is farthest from the vehicle body 2, and the second pump gear 123 that is closer to the vehicle body 2 than the first pump gear 122.

As illustrated in FIG. 5, FIG. 6, the transmission gear 127, and the first idle gear 120 are located in the middle case 32B. The second idle gear 121 is located at a position corresponding to a mounting portion to the middle case 32B in the gear case 117. The first pump gear 122 and the second pump gear 123 are located beside the middle case 32B and in the gear case 117.

The transmission gear 127 is a power takeoff gear and is mounted on the transmission shaft 119 such that the transmission gear 127 is rotatable together with the transmission shaft 119. The first idle gear 120, the second idle gear 121, the first pump gear 122 and the second pump gear 123 are supported in the gear case 117 rotatably about an axis extending in the front-rear direction.

The first idle gear 120 is engaged with the transmission gear 127. The second idle gear 121 is provided between the first idle gear 120 and the second pump gear 123, and engaged with the first idle gear 120 and the second pump gear 123. The first pump gear 122 is engaged with the second pump gear 123. The second pump gear 123 is located at a position lower than the second idle gear 121 and the first pump gear 122.

As illustrated in FIG. 6, the first shaft 124 and the second shaft 125 are arranged in the vehicle body width direction on one side of (on the right side of) the vehicle body 2 (middle case 32B). The first shaft 124 is provided concentrically with the first pump gear 122, and is rotatable together with the first pump gear 122 about the same axis. The second shaft 125 is provided concentrically with the second pump gear 123, and is rotatable together with the second pump gear 123 about the same axis. Thus, the first shaft 124 and the second shaft 125 are arranged in the vehicle body width direction on one side of the vehicle body 2 (middle case 32B), and receive power transmitted from the transmission shaft 119. The first shaft 124 is farther from the vehicle body 2 than the second shaft 125.

The first hydraulic pump 36 is located at a position corresponding to the first pump gear 122, and driven by the first shaft 124. The second hydraulic pump 79 is located at a position corresponding to the second pump gear 123, and driven by the second shaft 125. In other words, the first hydraulic pump 36 and the second hydraulic pump 79 face each other in a front-rear direction such that the first hydraulic pump 36 is driven by the first shaft 124 and the second hydraulic pump 79 is driven by the second shaft 125. The first shaft 124 is an input shaft for the first hydraulic pump 36, and the second shaft 125 is an input shaft for the second hydraulic pump 79.

Note that the power transmission to transmit power from the transmission shaft 119 to the first shaft 124 and the second shaft 125 is not limited to gear transmission.

According to the above-described configuration, the first hydraulic pump 36 and the second hydraulic pump 79 face each other in a front-rear direction such that the first hydraulic pump 36 is driven by the first shaft 124 which is farther from the vehicle body 2 than the second shaft 125, and the second hydraulic pump 79 is driven by the second shaft 125, thus the first hydraulic pump 36 and the second hydraulic pump 79 can be brought close to the vehicle body 2 (middle case 32B) as much as possible to reduce the gap or wasted space between the pump and the case (the vehicle body 2) to a minimum, and the first hydraulic pump 36 and the second hydraulic pump 79 can be arranged in a compact manner.

In other words, as compared to the second hydraulic pump 79 which is a fixed displacement gear pump, the first hydraulic pump 36 which is a variable displacement pump has a complicated structure, and in addition, has a larger size because the first hydraulic pump 36 is integrated with the LS regulator valve 44 and the third hydraulic pump 37 which are necessary for the configuration of the load sensing system. Therefore, when arrangement of the first hydraulic pump 36 and the second hydraulic pump 79 or the like is not taken into consideration, the working vehicle 1 increases in size. However, with the arrangement and the mounting structure for the first hydraulic pump 36 and the second hydraulic pump 79 in the present example embodiment, the compact working vehicle 1 can be achieved.

As illustrated in FIG. 8, in the working vehicle 1 of the present example embodiment, in order to ensure the capacity for the fuel tank 126, a fuel tank 126L with a large capacity is provided on the left side (where the first hydraulic pump 36 and the second hydraulic pump 79 are not provided) of the vehicle body 2, and a fuel tank 126R is also provided on the right side (where the first hydraulic pump 36 and the second hydraulic pump 79 are provided) of the vehicle body 2. The rear portion of the right fuel tank 126R extends beside the second hydraulic pump 79 and the gear case 117, and the capacity for the fuel tank 126 can be ensured by making the arrangement and the mounting structure for the first hydraulic pump 36 and the second hydraulic pump 79 compact.

The rotation direction of the first pump gear 122 is consistent with the rotation direction of the first hydraulic pump 36 in clockwise rotation in an axial end view as seen from the leading end of the pump input shaft (the first shaft 124). The first hydraulic pump 36 and the second hydraulic pump 79 are mounted on different shafts and at positions facing each other, thus as the second hydraulic pump 79, a typical one in clockwise rotation in an axial end view can be used. Since the first hydraulic pump 36 and the second hydraulic pump 79 are provided on different shafts, the gear ratios of both pumps can be set independently.

In the above-described configuration, the second pump gear 123 is located at a position lower than the second idle gear 121 and the first pump gear 122, thus the dimension of the gear transmission mechanism 118 in the vehicle body width direction can be reduced, and a compact configuration can be achieved. For example, when the second pump gear 123 is located at a position higher than the second idle gear 121 and the first pump gear 122, interference may occur with mounting of the gear case 117 to the middle case 32B. However, no interference occurs with mounting of the gear case 117 by disposing the second pump gear 123 at a position lower than the second idle gear 121 and the first pump gear 122, thus mission oil can be scraped up.

As illustrated in FIG. 4, the oil filter 49 on the suction side of the first hydraulic pump 36 is provided to extend in the vertical direction, and the oil filter 87 on the suction side of the second hydraulic pump 79 is provided to be inclined with respect to the vertical direction. In the present example embodiment, the oil filter 87 on the suction side of the second hydraulic pump 79 is provided in a rearward inclined manner. The second shaft 125 that is an input shaft for the second hydraulic pump 79 is located below the first shaft 124 that is an input shaft for the first hydraulic pump 36, thus for example, when the oil filter 87 on the suction side of the second hydraulic pump 79 is provided to extend in the vertical direction, the lower end of the oil filter 87 on the suction side of the second hydraulic pump 79 is located below the lower end of the oil filter 49 on the suction side of the first hydraulic pump 36. The height of the lower end of the oil filter 87 can be aligned with the height position of the lower end of the oil filter 49 on the suction side of the first hydraulic pump 36 by inclining the oil filter 87 on the suction side of the second hydraulic pump 79, thus the ground height of the oil filter 87 on the suction side of the second hydraulic pump 79 can be ensured. Also, the oil filter 87 can be positioned in a compact manner.

When producing both (i) a working vehicle of an OC type including a whole hydraulic system in which a hydraulic system provided with working-machine-related control valve(s) and a hydraulic system provided with traveling-power-transmission-related power shift valve(s) and steering-related power steering controller(s) each use an open center system supplied with hydraulic fluid by a fixed displacement gear pump and (ii) a working vehicle of an LS type including the whole hydraulic system 33 of the present example embodiment, it is possible to use a portion of the configuration of the whole hydraulic system in both working vehicles. By using a portion or all of the whole hydraulic system both in the working vehicle of an OC type and the working vehicle of an LS type of the present example embodiment, it is possible to easily produce two types of working vehicles (the working vehicle of an OC type and the working vehicle of an LS type) provided with different whole hydraulic systems using the same vehicle body and the like at low cost.

Note that in the present example embodiment, as the working-machine-related control valves, the front-working-machine control valve 41, the auxiliary control valve 59, the external control valve 63 and the working-machine-lifting control valve 23 have been illustrated. However, this does not imply any limitation, and the working-machine-related control valves may include a control valve other than the front-working-machine control valve 41, the auxiliary control valve 59, the external control valve 63 and the working-machine-lifting control valve 23. Alternatively, the working-machine-related control valves may include at least one of the front-working-machine control valve 41, the auxiliary control valve 59, the external control valve 63 or the working-machine-lifting control valve 23.

In the present example embodiment, both the power shift valve 83 and the power steering controller 82 are configured to be provided in the second hydraulic system 35 supplied with hydraulic fluid by the second hydraulic pump 79, but this does not imply any limitation, and at least one of the power shift valve 83 or the power steering controller 82 may be configured to be provided in the second hydraulic system 35.

Example embodiments of the present invention provide working vehicles 1 described in the following items.

(Item 1) A working vehicle 1 including a first hydraulic pump 36 which is a variable displacement pump with a delivery flow rate controlled by load sensing control, a second hydraulic pump 79 which is a fixed displacement pump, at least one working-machine-related control valve (a front-working-machine control valve 41, an auxiliary control valve 59, an external control valve 63, and/or a working-machine-lifting control valve 23) to control at least one working-machine-related hydraulic actuator (a boom cylinder 15, a working tool cylinder 17, a hydraulic actuator 61, a hydraulic actuator 62, and/or a working-machine-lifting actuator 22), a power shift valve 83 to control at least one traveling-power-transmission-related hydraulic actuator (a forward travel hydraulic actuator 93, a rearward travel hydraulic actuator 94, a first speed stage hydraulic actuator 95, a second speed stage hydraulic actuator 96, a third speed stage hydraulic actuator 97, a fourth speed stage hydraulic actuator 98, a high-speed hydraulic actuator 99, a low-speed hydraulic actuator 100, a first front wheel drive hydraulic actuator 101, a second front wheel drive hydraulic actuator 102, a rear wheel differential lock hydraulic actuator 103, and/or a front wheel differential lock hydraulic actuator 104), and a power steering controller 82 to control a steering-related hydraulic actuator (steering cylinder 89), wherein the at least one working-machine-related control valve 41, 59, 63, 23 is provided in a first hydraulic system 34 supplied with hydraulic fluid by the first hydraulic pump 36, and at least one of the power shift valve 83 or the power steering controller 82 is provided in a second hydraulic system 35 supplied with hydraulic fluid by the second hydraulic pump 79.

With the working vehicle 1 according to item 1, the working-machine-related control valve is provided in the first hydraulic system 34 supplied with hydraulic fluid by the first hydraulic pump 36 with a delivery flow rate controlled by load sensing control, and at least one of the traveling-power-transmission-related power shift valve 83 or the steering-related power steering controller 82 is provided in the second hydraulic system 35 supplied with hydraulic fluid by the second hydraulic pump 79 which is a fixed displacement pump. This makes it possible to simplify the structure of the whole hydraulic system even though it uses the load sensing system, and possible to make the structure of the whole hydraulic system compact. In other words, since the load sensing system and the open center system are used in combination in the whole hydraulic system, it is possible to make the structure of the whole hydraulic system compact, as compared to when the whole hydraulic system is based entirely on a load sensing system. Since it is possible to make the hydraulic system compact, it is possible to provide a working vehicle 1 having a compact structure.

(Item 2) The working vehicle 1 according to item 1, further including a vehicle body 2 including a front portion to have a front working machine 12 attached thereto, wherein the at least one working-machine-related control valve includes a front-working-machine control valve 41 to control one or more of the at least one working-machine-related hydraulic actuator (a boom cylinder 15 and/or a working tool cylinder 17) that are in or on the front working machine 12.

With the working vehicle 1 according to item 2, at least one of the traveling-power-transmission-related power shift valve 83 or the steering-related power steering controller 82 is provided in the second hydraulic system 35 supplied with hydraulic fluid by the fixed displacement hydraulic pump, thus making it possible to supply hydraulic fluid to the front-working-machine control valve 41 while keeping the number of priority valves low.

(Item 3) The working vehicle 1 according to item 1, further including a vehicle body 2 to have a working machine (rear working machine 20) attached thereto, wherein the at least one working-machine-related control valve includes an auxiliary control valve 59 to control one or more of the at least one working-machine-related hydraulic actuator 61 that are in or on the working machine 20.

With the working vehicle 1 according to item 3, at least one of the traveling-power-transmission-related power shift valve 83 or the steering-related power steering controller 82 is provided in the second hydraulic system 35 supplied with hydraulic fluid by the fixed displacement hydraulic pump, thus making it possible to supply hydraulic fluid to the auxiliary control valve 59 while keeping the number of priority valves low.

(Item 4) The working vehicle 1 according to item 1, further including a vehicle body 2 to have a working machine (rear working machine 20) attached thereto, the working machine 20 being provided with one or more of the at least one working-machine-related hydraulic actuator 62 and an external control valve 63 which is one of the at least one working-machine-related control valve, and a hydraulic outlet 60 provided in or on the vehicle body 2 to allow hydraulic fluid to be supplied from the first hydraulic pump 36 to the working machine 20, wherein the at least one working-machine-related control valve includes the external control valve 63 in or on the working machine 20.

With the working vehicle 1 according to item 4, at least one of the traveling-power-transmission-related power shift valve 83 or the steering-related power steering controller 82 is provided in the second hydraulic system 35 supplied with hydraulic fluid by the fixed displacement hydraulic pump, thus making it possible to supply hydraulic fluid to the external control valve 63 while keeping the number of priority valves low.

(Item 5) The working vehicle 1 according to item 1, including a vehicle body 2 to have a working machine (rear working machine 20) attached thereto, a working-machine-attaching mechanism 21 to attach the working machine 20 to the vehicle body 2, and a working-machine-lifting actuator 22 which is one of the at least one working-machine-related hydraulic actuator to raise and lower the working-machine-attaching mechanism 21, wherein the at least one working-machine-related control valve includes a working-machine-lifting control valve 23 to control the working-machine-lifting actuator 22.

With the working vehicle 1 according to item 5, at least one of the traveling-power-transmission-related power shift valve 83 or the steering-related power steering controller 82 is provided in the second hydraulic system 35 supplied with hydraulic fluid by the fixed displacement hydraulic pump, thus making it possible to supply hydraulic fluid to the working-machine-lifting control valve 23 while keeping the number of priority valves low.

(Item 6) The working vehicle 1 according to any one of items 1 to 5, wherein the first hydraulic system 34 includes a third hydraulic pump 37 provided upstream of the first hydraulic pump 36 to supply hydraulic fluid to the first hydraulic pump 36, and a return passage 65 branching from a hydraulic passage 48 between the third hydraulic pump 37 and the first hydraulic pump 36 and connected to an oil cooler 64 to allow an excess of hydraulic fluid, which flows from the third hydraulic pump 37 to the first hydraulic pump 36, to return to a reservoir 32 of hydraulic fluid through the oil cooler 64.

With the working vehicle 1 according to item 6, since an excess of hydraulic fluid from the third hydraulic pump 37 is allowed to flow through the oil cooler 64, it is possible to cool hydraulic fluid without having to separately provide a pump for cooling.

(Item 7) The working vehicle 1 according to item 6 referring to item 1, further including a vehicle body 2 to have a working machine (rear working machine 20) attached thereto, wherein the first hydraulic system 34 includes a feedback passage 67 to allow hydraulic fluid returned from the at least one working-machine-related hydraulic actuator to flow therethrough and connected to the return passage 65, and a check valve 69 provided in the return passage 65 at a location upstream of a junction 70 between the feedback passage 67 and the return passage 65 to prevent backflow of hydraulic fluid from the junction 70 toward the third hydraulic pump 37, the at least one working-machine-related control valve includes an auxiliary control valve 59 to control one or more of the at least one working-machine-related hydraulic actuator 61 that are in or on the working machine 20, and the feedback passage 67 is configured to allow hydraulic fluid returned from the auxiliary control valve 59 to merge with hydraulic fluid flowing through the return passage 65.

With the working vehicle 1 according to item 7, even when an excess of hydraulic fluid from the third hydraulic pump 37 decreases due to use of the first hydraulic pump 36, it is possible to ensure the cooling performance when the auxiliary control valve 59 is used.

(Item 8) The working vehicle 1 according to item 7, wherein the first hydraulic system 34 includes a drain passage 71 different from the return passage 65 and configured to drain an excess of hydraulic fluid, which flows from the third hydraulic pump 37 to the first hydraulic pump 36, to the reservoir 32 through a relief valve 73, and a set pressure of the check valve 69 is lower than a set pressure of the relief valve 73.

With the working vehicle 1 according to item 8, an excess of hydraulic fluid from the third hydraulic pump 37 is allowed to flow to the oil cooler 64.

(Item 9) A working vehicle 1 including a first hydraulic pump 36 which is a variable displacement pump with a delivery flow rate controlled by load sensing control, a second hydraulic pump 79 which is a fixed displacement pump, a vehicle body 2 which houses a transmission shaft 119 to receive power from a power source, and a first shaft 124 and a second shaft 125 which are arranged in a vehicle body width direction on one side of the vehicle body 2 to receive power from the transmission shaft 119, wherein the first shaft 124 is farther from the vehicle body 2 than the second shaft 125 is, and the first hydraulic pump 36 and the second hydraulic pump 79 face each other in a front-rear direction such that the first hydraulic pump 36 is driven by the first shaft 124 and the second hydraulic pump 79 is driven by the second shaft 125.

With the working vehicle 1 according to item 9, it is possible to arrange the first hydraulic pump 36 and the second hydraulic pump 79 in a compact manner, and thus possible to provide a working vehicle 1 having a compact structure.

The working vehicle 1 according to item 9, further including a gear transmission mechanism 118 to transmit power from the transmission shaft 119, the gear transmission mechanism 118 including a plurality of gears arranged in a lateral direction from the vehicle body 2, wherein the gear transmission mechanism 118 includes a first pump gear 122 which is one of the plurality of gears that is farthest from the vehicle body 2, and a second pump gear 123 which is another of the plurality of gears that is closer to the vehicle body 2 than the first pump gear 122 is, the first hydraulic pump 36 and the second hydraulic pump 79 are arranged in the front-rear direction with the gear transmission mechanism 118 therebetween, the first shaft 124 is rotatable together with the first pump gear 122 about the same axis, and the second shaft 125 is rotatable together with the second pump gear 123 about the same axis.

With the working vehicle 1 according to item 10, since power is transmitted to the first hydraulic pump 36 and the second hydraulic pump 79 via gear transmission, it is possible to easily and compactly configure the structure for attachment of the first hydraulic pump 36 and the second hydraulic pump 79.

(Item 11) The working vehicle 1 according to item 10, wherein the gear transmission mechanism 118 includes a transmission gear 127 rotatable together with the transmission shaft 119, a first idle gear 120 to be engaged with the transmission gear 127, and a second idle gear 121 to be engaged with the first idle gear 120 and the second pump gear 123, and the first pump gear 122 is engaged with the second pump gear 123.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
a first hydraulic pump which is a variable displacement pump with a delivery flow rate controlled by load sensing control;
a second hydraulic pump which is a fixed displacement pump;
at least one working-machine-related control valve to control at least one working-machine-related hydraulic actuator;
a power shift valve to control at least one traveling-power-transmission-related hydraulic actuator; and
a power steering controller to control a steering-related hydraulic actuator; wherein
the at least one working-machine-related control valve is provided in a first hydraulic system supplied with hydraulic fluid by the first hydraulic pump; and at least one of the power shift valve or the power steering controller is provided in a second hydraulic system supplied with hydraulic fluid by the second hydraulic pump.

2. The working vehicle according to claim 1, further comprising:
a vehicle body including a front portion to have a front working machine attached thereto; wherein
the at least one working-machine-related control valve includes a front-working-machine control valve to control one or more of the at least one working-machine-related hydraulic actuator that are in or on the front working machine.

3. The working vehicle according to claim 1, further comprising:
a vehicle body to have a working machine attached thereto; wherein
the at least one working-machine-related control valve includes an auxiliary control valve to control one or more of the at least one working-machine-related hydraulic actuator that are in or on the working machine.

4. The working vehicle according to claim 1, further comprising:
a vehicle body to have a working machine attached thereto, the working machine being provided with one or more of the at least one working-machine-related hydraulic actuator and an external control valve which is one of the at least one working-machine-related control valve; and
a hydraulic outlet provided in or on the vehicle body to allow hydraulic fluid to be supplied from the first hydraulic pump to the working machine; wherein
the at least one working-machine-related control valve includes the external control valve in or on the working machine.

5. The working vehicle according to claim 1, further comprising:
a vehicle body to have a working machine attached thereto;
a working-machine-attaching mechanism to attach the working machine to the vehicle body; and
a working-machine-lifting actuator which is one of the at least one working-machine-related hydraulic actuator to raise and lower the working-machine-attaching mechanism; wherein
the at least one working-machine-related control valve includes a working-machine-lifting control valve to control the working-machine-lifting actuator.

6. The working vehicle according to claim 1, wherein the first hydraulic system includes:
a third hydraulic pump provided upstream of the first hydraulic pump to supply hydraulic fluid to the first hydraulic pump; and
a return passage branching from a hydraulic passage between the third hydraulic pump and the first hydraulic pump and connected to an oil cooler to allow an excess of hydraulic fluid, which flows from the third hydraulic pump to the first hydraulic pump, to return to a reservoir of hydraulic fluid through the oil cooler.

7. The working vehicle according to claim 6, further comprising:
a vehicle body to have a working machine attached thereto; wherein
the first hydraulic system includes:
a feedback passage to allow hydraulic fluid returned from the at least one working-machine-related hydraulic actuator to flow therethrough and connected to the return passage; and
a check valve provided in the return passage at a location upstream of a junction between the feedback passage and the return passage to prevent backflow of hydraulic fluid from the junction toward the third hydraulic pump;
the at least one working-machine-related control valve includes an auxiliary control valve to control one or more of the at least one working-machine-related hydraulic actuator that are in or on the working machine; and
the feedback passage is configured to allow hydraulic fluid returned from the auxiliary control valve to merge with hydraulic fluid flowing through the return passage.

8. The working vehicle according to claim 7, wherein the first hydraulic system includes:
a drain passage different from the return passage and configured to drain an excess of hydraulic fluid, which flows from the third hydraulic pump to the first hydraulic pump, to the reservoir through a relief valve; and
a set pressure of the check valve is lower than a set pressure of the relief valve.

9. A working vehicle comprising:
a first hydraulic pump which is a variable displacement pump with a delivery flow rate controlled by load sensing control;
a second hydraulic pump which is a fixed displacement pump;
a vehicle body which houses a transmission shaft to receive power from a power source; and
a first shaft and a second shaft which are arranged in a vehicle body width direction on one side of the vehicle body to receive power from the transmission shaft; wherein
the first shaft is farther from the vehicle body than the second shaft is; and
the first hydraulic pump and the second hydraulic pump face each other in a front-rear direction such that the first hydraulic pump is driven by the first shaft and the second hydraulic pump is driven by the second shaft.

10. The working vehicle according to claim 9, further comprising:
a gear transmission mechanism to transmit power from the transmission shaft, the gear transmission mechanism including a plurality of gears arranged in a lateral direction from the vehicle body; wherein
the gear transmission mechanism includes a first pump gear which is one of the plurality of gears that is farthest from the vehicle body, and a second pump gear which is another of the plurality of gears that is closer to the vehicle body than the first pump gear is;
the first hydraulic pump and the second hydraulic pump are arranged in the front-rear direction with the gear transmission mechanism therebetween;
the first shaft is rotatable together with the first pump gear about the same axis; and
the second shaft is rotatable together with the second pump gear about the same axis.

11. The working vehicle according to claim 10, wherein the gear transmission mechanism includes a transmission gear rotatable together with the transmission shaft, a first idle gear to be engaged with the transmission gear, and a second idle gear to be engaged with the first idle gear and the second pump gear; and
the first pump gear is engaged with the second pump gear.

* * * * *